A. CLIST.
Spoke-Socket.
No. 167,498. Patented Sept. 7, 1875.
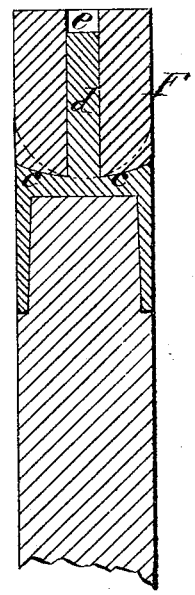
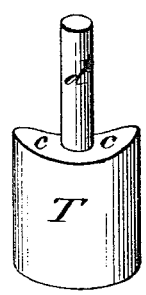
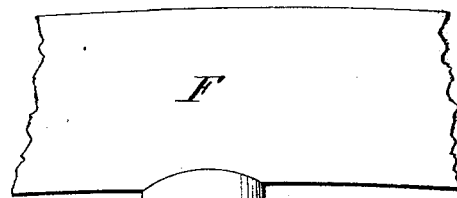
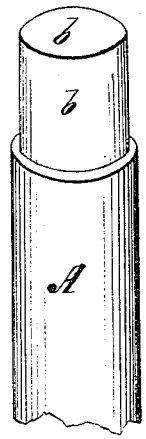

UNITED STATES PATENT OFFICE.

ALBERT CLIST, OF DELHI, NEW YORK.

IMPROVEMENT IN SPOKE-SOCKETS.

Specification forming part of Letters Patent No. 167,498, dated September 7, 1875; application filed July 1, 1875.

*To all whom it may concern:*

Be it known that I, ALBERT CLIST, of Delhi, county of Delaware and State of New York, have invented a new and useful Improvement in Wagon and Carriage Wheels; and I do hereby declare that the following is a full, clear, and exact description thereof, reference being had to the accompanying drawings, making part of this specification, in which—

Figure 1 is an elevation showing a portion of a spoke and a portion of the felly of a carriage or wagon wheel, the former constructed according to my present invention, and the latter adapted in form to the same. Fig. 2 is a vertical section of Fig. 1. Fig. 3 is a detached view of a concave thimble-tenon used in connection with my improved spokes. Fig. 4 is an elevation showing a portion of a wagon-spoke made according to my improvement, having an oval tenon formed on its outer end, and adapted for insertion into the metallic concave thimble shown in like view in Fig. 3.

The object of my invention is, in the manufacture of wagon-wheels and wheels for other vehicles, to preserve intact, so far as possible, the strength of the spoke at the tenon formed on its outer end, where it is connected with the felly or rim of the wheel, at which point the greatest power of the spoke is required to assist the strain and jar incident to use of the wheel.

In order to attain the objects set forth I construct the spokes A of a wagon or carriage wheel with an oval-shaped tenon, $b$, which is of but little less area in cross-section than the full size of the spoke, thus securing to the tenon $b$ almost the full power of resistance of the spoke against the strain which in the use of the wheel falls upon this part of the spoke. This tenon is made slightly tapering, in order that it may be firmly driven into a hollow metallic oval-shaped shell, T, represented in elevation in Fig. 3. This hollow or thimble shell T, preferably made of malleable iron, is formed with broad concave shoulders $c$, in order to afford a full bearing for the felly, as shown in Figs. 1 and 2, and also clasp the under face of the felly when the felly is seated in the concave, as indicated in said last-named figure. The thimble T is made, as usual, with a tenon, $d$, which projects therefrom and enters a mortise, $e$, through the rim F.

I am aware that it is old to interpose concave metallic plates, with tenon and socket, between the spokes and fellies of wheels, and, therefore, I do not claim this as my invention. Neither do I claim an elliptical tenon let into the felly of a wheel, or into a box or tip let into the felly of the wheel; but What I do claim is—

A spoke having an end which is elliptical in cross-section, and provided with a flanged metallic tip, fitted thereon and resting against the outside of the felly, and having a small stem projecting from it and extending into the felly, whereby increased strength in the end of the spoke is secured, and the weakening of the felly by a large cavity therein is avoided, all substantially as set forth.

ALBERT CLIST.

Witnesses:
ELIHU CHILSON,
JOHN T. SHAW.